Feb. 23, 1965 B. J. NORTON ET AL 3,171,104

VARIABLE RELUCTANCE BINARY DATA TRANSDUCER

Filed Oct. 13, 1959

INVENTORS
BERNARD J. NORTON
WILLIAM D. SAUTER
BY
ATTORNEY 3,171,104

VARIABLE RELUCTANCE BINARY DATA TRANSDUCER

Bernard J. Norton, Norwood, Mass., and William D. Sauter, Seacliff, N.Y., assignors to Sperry Rand Corporation, Great Neck, N.Y., a corporation of Delaware Filed Oct. 13, 1959, Ser. No. 846,145
5 Claims. (Cl. 340—174.1)

The present invention relates to binary data readout devices and, more particularly, to such a device which simultaneously senses the magnetic properties of dual binary data storage elements and produces output signals having opposite characteristics for representing stored binary "ones" and binary "zeros."

Prior art mechanisms for the storage and readout of binary data include devices requiring physican contact between the storage and sensing elements. In a representative case, the data is stored in conductive and nonconductive element portions of a storage member which is in slidable contact with a conductive brush. A conductive circuit is formed whenever the brush contacts a conductive storage element; the circuit is broken at other times when the brush contacts a nonconductive storage element. If the brush is suitably energized by a source of potential, for example, the flow of current at a given instance is indicative of the presence of a conductive storage element under the contacting brush whereas the absence of current flow indicates the presence of a nonconductive storage element under the contacting brush. Thus, discrete binary data, represented by a sequence of conductive and nonconductive storage elements, may be sensed by an energized conductive brush to produce a series of output current signals representing the stored digital data.

Binary data storage and sensing means involving physical contact between the storage elements and the data sensing member suffer the disadvantages of relatively short life, limited readout speed and reduced reliability which seriously detracts from their inherent structural simplicity. To overcome these disadvantages, means have been proposed which obviate the necessity for mechanical contact between the storage and sensing elements.

One common technique is to employ storage elements wherein binary data is represented by respectively associated magnetized and unmagnetized storage elements. The stored data is read out by a magnetic sensing element basically comprising a coil of wire wound about a stationary core which is brought into close clearing relationship with the storage elements. The presence of a magnetized element under the sensing element produces core saturation; no core saturation results otherwise. The saturation condition of the sensing element core and, hence, the nature of the data represented by the storage elements, is determined by applying interrogating pulses of constant current to the sensing element. Output pulses are produced whenever the sensing element core is nonsaturated, i.e., when a nonmagnetized storage element is positioned under the interrogated sensor.

Although magnetic data sensing elements such as described above eliminate the disadvantages of other prior art data readout devices which require physical contact between the storage and readout elements, difficulties are encountered in reliably distinguishing between the output signals respectively representing the stored binary ones and binary zeros. A finite output signal is produced when one binary value is being sensed while substantially no output signal is produced when the other binary value is being sensed. Experience has shown that data discrimination based upon signal amplitude alone cannot always be relied upon inasmuch as the readout signal amplitudes tend to vary with time and in the presence of noise.

It is the principal object of the present invention to provide binary data storage and readout means requiring no physical contact between the storage and readout elements and producing output signals of opposite characteristic for representing binary ones and zeros.

Another object of the present invention is to provide variable reluctance sensing means for reading out stored binary data and for producing output signals of opposite polarity for representing stored binary ones and binary zeros.

These and other objects of the present invention, as will appear upon a reading of the following specification, are achieved in a representative shaft position encoder embodiment by the provision of a plurality of circular binary data storage tracks mounted upon a rotatable disc. Each storage track is of a different radius and comprises, in turn, two longitudinally abutting and concentric component tracks which have been angularly displaced relative to each other by one digital data position. Each component track consists of magnetic and nonmagnetic portions respectively representing opposite kinds of binary digits. An E pick-off is provided for sensing the data stored in a respective track, the pick-off being mounted at right angles to the direction of track travel.

The outer coils of the E pick-off are wound and serially connected to each other so that the currents induced in them tend to flow in opposite directions. Means are provided for pulsing the center coil of the E pick-off whenever it is desired to read out the data stored in the storage element located beneath the pick-off. A current is caused to flow in the interconnected outer windings of the E pick-off in a direction indicative of the half of the E pick-off which is in close proximity with a low reluctance portion of the storage track. Inasmuch as each E pick-off is mounted at a fixed radius relative to the rotating disc and because the disc storage track associated with each E pick-off is of a magnetic material whose radial location varies discretely, the direction of the current flowing in the outer windings of the E pick-off represents the sense of the radial displacement of the track relative to the E pick-off. This, in turn, is discretely representative of stored binary data.

For a more complete understanding of the present invention, reference should be had to the following specification and to the figures of which:

Figures 1, 2:
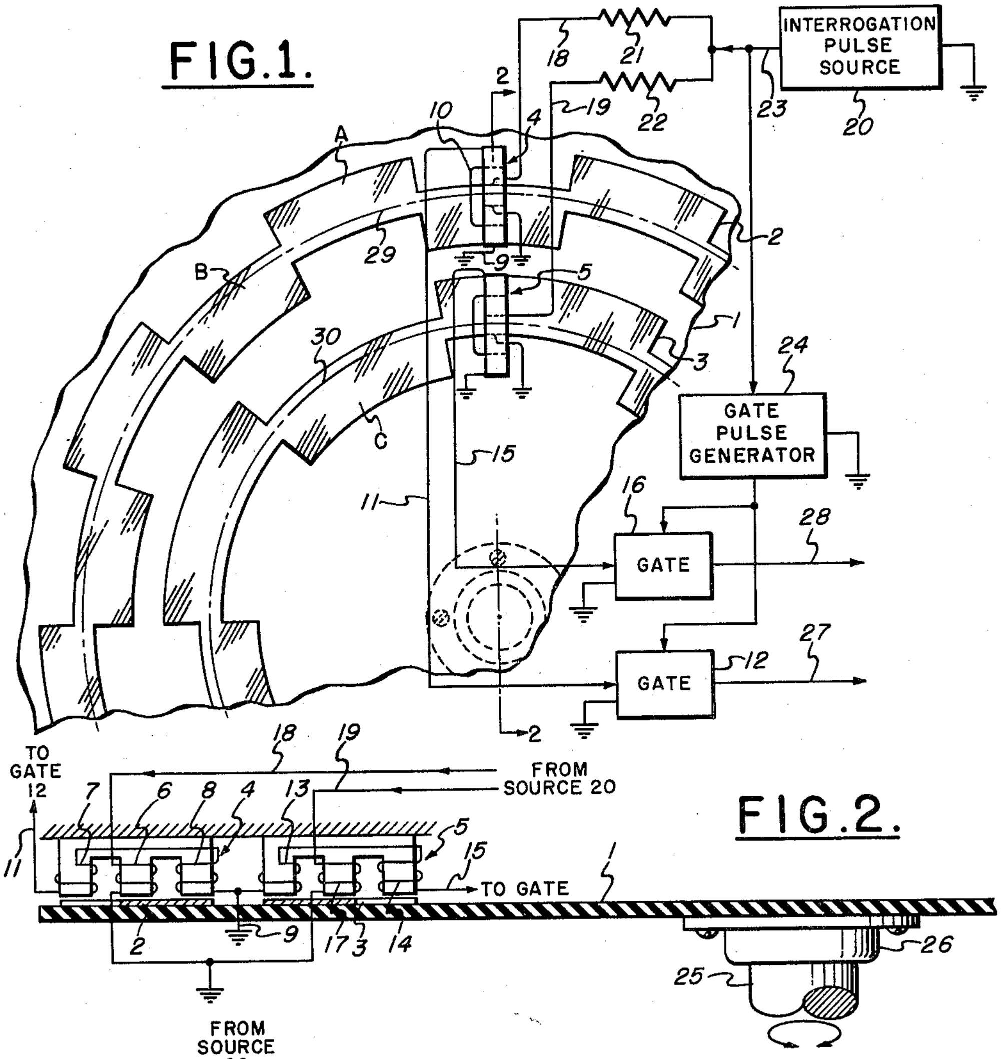
FIG. 1 is a simplified schematic view of a shaft position digital encoder utilizing the magnetic data storage and sensing elements of the present invention.
FIG. 2 is a sectional view of the apparatus of FIG. 1 taken along the axis 2—2.

In FIGS. 1 and 2, a cut-away portion of a circular disc of nonmagnetic material is represented by the numeral 1. Disc 1 is rigidly mounted to rotatable shaft 25 by flange 26. Superimposed on disc 1 at respective radii are circular tracks 2 and 3 of magnetic material. It will be noted that the magnetic material comprising each of the tracks is disposed at one of two radial locations relative to the disc. For example, portion A of track 2 is disposed at a greater radius than is portion B of track 2 relative to the axis of disc 1.

Sensing elements 4 and 5 are mounted in fixed radial position over respective ones of the tracks 2 and 3 at right angles to the direction of track travel. Each sensing element in the preferred embodiment comprises an E pick-off, shown more clearly in the view of FIG. 2, comprising a center winding 6 and two outer windings 7 and 8. The outer windings 7 and 8 are connected in series circuit opposition so that any currents induced in windings 7 and 8 by the energization of center winding 6 will tend to flow in opposite directions.

Winding 8 is connected between ground and one terminal of winding 7, the other terminal of which is connected by lead 11 to a first input of electronic gate 12. The outer windings 13 and 14 of storage element 5 are similarly interconnected with the output signal therefrom being applied via lead 15 to a first input of electronic gate 16. Center windings 6 and 17 of elements 4 and 5 are respectively energized by leads 18 and 19 which are coupled to interrogation pulse source 20 by isolating resistors 21 and 22, respectively. The output signal of source 20, appearing on line 23, is also connected to gate pulse generator 24 the output of which is simultaneously applied to second inputs of electronic gates 16 and 12.

In the illustrative shaft position encoder embodiment of FIGS. 1 and 2, only two data storage tracks 2 and 3 are shown for the sake of simplicity and clarity. Additional tracks may be required as is understood in the art depending upon the desired degree of shaft position resolution. The additional tracks which may be used are identical to 2 and 3 excepting that they would lie at different radii with respect to the axis of disc 1 while the angular extent of the individual portions such as portion A of track 2 would increase by powers of 2 for each successively inner track. For example, the angular extent of portion C of track 3 is twice that of portion B of the next succeeding outer track 2.

In operation, a pulse of current is produced at the output of source 20 when the angular position of shaft 25 is to be sensed by elements 4 and 5. The sensing pulse is applied via isolating resistors 21 and 22 to simultaneously energize the center windings 6 and 17 of elements 4 and 5. In the views of FIGS. 1 and 2 the magnetic material of track 2 is positioned between inner coil 6 and outer coil 8 of element 4. Inner coil 6 and outer coil 7 are separated by an air gap. As a result, inner coil 6 is coupled by a low reluctance path to outer coil 8 at the same time that it is effectively isolated from outer coil 7 by the air gap. The output current flows in lead 11 in a direction indicative of the fact that outer coil 8 is the one which is coupled to center coil 6.

In the case of sensing element 5, the magnetic material of track 3 bridges the gap between center coil 17 and outer coil 13 of element 5. Center coil 17 is effectively isolated from outer coil 14 of element 5 by an air gap. Consequently, a current will flow in output line 15 in a direction indicating that center coil 17 is coupled to output coil 13. It should be noted that the direction of current flow in output leads 11 and 15 of elements 4 and 5 would be in a reverse direction in the event that the magnetic material of tracks 2 and 3 were so disposed that center coil 6 were coupled to outer coil 7 of element 4 and if center coil 17 were coupled to outer coil 14 of element 5.

One terminal of outer coils 8 and 13 of elements 4 and 5, respectively, are grounded by lead 9. Consequently, the current pulses on output leads 11 and 15 will have a polarity with respect to ground which is indicative of the value of the binary number being sensed. For example, assume that the greater radii portions of tracks 2 and 3 represent binary ones while the lesser radii portions represent binary zeros. In this case, element 4 is sensing a lesser radii portion of track 2 while element 5 is sensing a greater radii portion of track 3. Thus, the pulses on output leads 11 and 15 are of opposite polarity.

It will be seen that a substantial degree of discrimination is achieved by providing for output pulses having discrete polarities representative of the respective data. In the presence of noise superimposed on the sensed data signals, for example, the likelihood that noise pulses will be mistaken for data pulses is substantially reduced in comparison with prior art systems wherein the sensed data signals are distinguished solely on amplitude basis both being of the same polarity. Thus, the output signals from gates 16 and 12 will be of a polarity determined by the data stored in tracks 3 and 2, respectively, and will be substantially unaffected by spurious signals which may be present during the data readout interval.

Figures 3, 4:
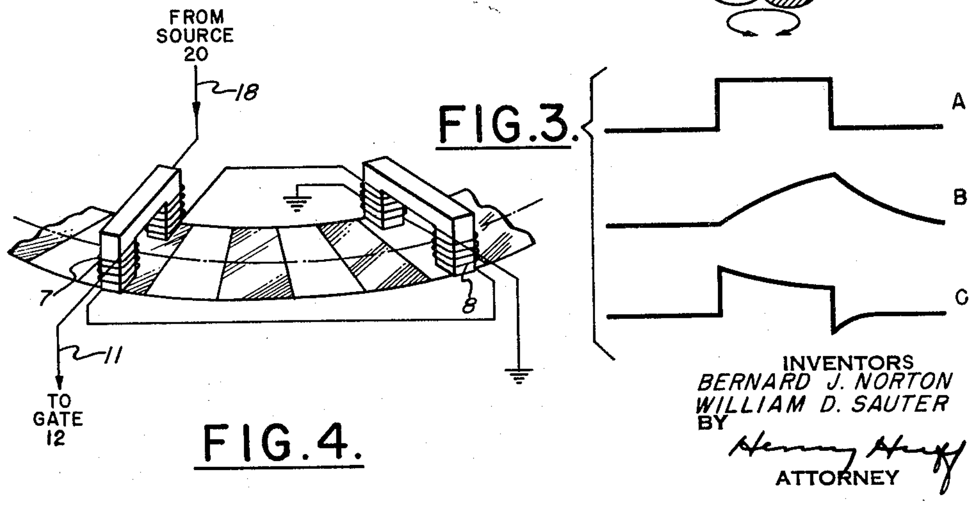
FIG. 3 is a series of waveforms useful in explaining the operation of the apparatus shown in FIG. 1.
FIG. 4 is a perspective view of an alternative embodiment of the storage and sensing elements of FIG. 1.

Waveform A of FIG. 3 represents the voltage pulse produced by interrogation pulse source 20. The voltage pulse of waveform A produces the flow of the current pulse of waveform B in each of the center windings of the elements 4 and 5. Waveform C represents the voltage pulse produced on output line 15, for example, which output pulse rapidly rises to a maximum positive value in response to the input pulse of waveform A then decays somewhat to a lesser value and then abruptly falls upon the termination of the input pulse of waveform A. The trailing edge of the positive pulse portion of waveform C falls below ground due to the inductance of elements 4 and 5 and then quickly returns to ground. Although the major portion of output waveform C properly is of positive polarity for representing a stored binary one, there remains the possibility that the short negative overshoot following the termination of the input pulse of waveform A may be misinterpreted as representing a binary zero. In order to preclude such eventuality, gate pulse generator 24 is provided which produces a short sampling pulse in response to each of the interrogation pulses of source 20. Pulse generator 24 may comprise, for example, a blocking oscillator producing an output pulse of shorter duration than the triggering pulse from source 20 and occurring substantially simultaneously therewith. The gating pulse output of generator 24 activates gates 16 and 12 whereby only the unambiguous leading portions of the output pulses on lines 15 and 11 are sampled and permitted to pass to output leads 28 and 27.

It should be observed that each of the E pick-offs such as elements 4 and 5 may be considered as essentially consisting of two component members each generally conforming to a C and having one input and one output winding. In the case of the E pick-off, the input windings of the two C-shaped component members are connected together to form the central winding such as winding 6 of pick-off 4. Similarly, each of the tracks such as 2 and 3 may be considered as essentially comprising two component tracks which longitudinally abut along respective circular axes 29 and 30. The portion A of track 2, for example, lying at greater radius than axis 29 is substantially mirror-symmetric to portion B lying at lesser radius than axis 29. That is, portion B is substantially of the shape of the mirror image of portion A as would appear in a curved mirror if one were placed along axis 29. However, each of the component tracks are angularly displaced one data position relative to each other.

The objectives of the present invention which include the magnetic sensing of stored binary data and the production of output signals of opposite polarity for representing opposite ones of the stored binary data may be accomplished in alternative ways. For example, either the two component sensing elements such as the previously discussed component C-shaped members may be radially aligned with respect to disc 1 so as to form an E pick-off while the component tracks being sensed by each are mutually displaced or, alternatively, the two component track portions being sensed may be radially aligned with the C-shaped component sensing members being mutually displaced. The latter arrangement is shown in FIG. 4. In either event, the data stored in the magnetic material tracks is sensed without physical contact to produce output signals of opposite polarity to represent respectively corresponding opposite ones of the stored binary data.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A binary data transducer comprising first and second C-shaped data sensing members each having an input and an output winding, the output windings being interconnected in series circuit whereby the currents induced in said interconnected output windings tend to flow in opposite directions, means for pulsing said input windings so as to induce said currents in said output windings, first and second substantially mirror-symmetric longitudinally abutting data storage members comprising transverse sections of magnetic and nonmagnetic material, and means for positioning said data sensing and said data storage members in close clearing relationship and allowing for close clearing relative movement of said sensing members longitudinally along said storage members, said sensing members being positioned across the direction of said movement, and one of said sensing members and said storage members being mutually displaced by a predetermined amount along the direction of said movement.

2. A binary data transducer comprising first and second C-shaped data sensing members each having an input and an output winding, the output windings being interconnected in series circuit whereby the currents induced in said interconnected output windings tend to flow in opposite directions, means for pulsing said input windings so as to induce said currents in said output windings, first and second substantially mirror-symmetric longitudinally abutting data storage members comprising transverse sections of magnetic and nonmagnetic material, and means for positioning said sensing and said data storage members in close clearing relationship and allowing for close clearing relative movement of said sensing members longitudinally along said storage members, said sensing members being positioned across the direction of said movement and said data storage members being mutually displaced by a predetermined amount along the direction of said movement.

3. A binary data transducer comprising an E pick-off having a center coil and first and second outer coils, said outer coils being interconnected in series circuit whereby the currents induced therein tend to flow in opposite directions, means for pulsing said center coil so as to induce said currents in said outer coils, first and second substantially mirror-symmetric longitudinally abutting data storage members comprising transverse sections of magnetic and nonmagnetic material, and means for positioning said E pick-off and said data storage members in close clearing relationship and allowing for close clearing relative movement of said E pick-off longitudinally along said storage members, said E pick-off being positioned at right angles to the direction of said movement, and said storage members being mutually displaced by a predetermined amount along the direction of said movement.

4. A binary data transducer comprising an E pick-off having a center coil and first and second outer coils, the outer coils being interconnected in series circuit whereby the currents induced therein tend to flow in opposite directions, means for pulsing said center coil so as to induce said currents in said outer coils, a data storage member comprising a track of transverse sections of magnetic material discretely disposed about a line running longitudinally along said track, and means for positioning said E pick-off and said data storage members in close clearing relationship and allowing for close clearing relative movement of said E pick-off longitudinally along said storage member, said E pick-off being positioned across the direction of said movement whereby each of said discretely disposed transverse sections of said storage member track selectively inductively couples said center coil to a respective one of said outer coils.

5. A binary data transducer comprising an E pick-off having a center coil and first and second outer coils, the outer coils being interconnected in series circuit whereby the currents induced therein tend to flow in opposite directions, means for pulsing said center coil so as to induce said currents in said outer coils, a data storage member comprising a track of transverse sections of magnetic material discretely disposed about a line running longitudinally along said track, means for positioning said E pick-off and said data storage members in close clearing relationship and allowing for close clearing relative movement of said E pick-off longitudinally along said storage member, said E pick-off being positioned across the direction of said movement whereby each of said discretely disposed transverse sections of said storage member track selectively inductively couples said center coil to a respective one of said outer coils, gating means having a signal input and a control input, said signal input being connected to said interconnected outer coils, and gate generating means for coupling said control input to said means for pulsing, said gate generating means rendering said gating means conductive simultaneously with the pulsing of said center coil but for a shorter period of time.

References Cited in the file of this patent

UNITED STATES PATENTS

| | | |
|---|---|---|
| 2,590,091 | Devol | Mar. 25, 1952 |
| 2,685,082 | Beman et al. | July 27, 1954 |
| 2,779,539 | Darlington | Jan. 29, 1957 |
| 2,794,851 | Morris | June 4, 1957 |
| 2,905,874 | Kelling | Sept. 22, 1959 |
| 2,938,199 | Berman | May 24, 1960 |

FOREIGN PATENTS

| | | |
|---|---|---|
| 886,261 | Great Britain | Jan. 3, 1962 |